(12) United States Patent
Lee et al.

(10) Patent No.: US 10,812,697 B2
(45) Date of Patent: Oct. 20, 2020

(54) CAMERA MODULE

(71) Applicant: Samsung Electro-Mechanics Co., Ltd., Suwon-si (KR)

(72) Inventors: Kyung Hun Lee, Suwon-si (KR); Jae Kyung Kim, Suwon-si (KR); Bo Sung Seo, Suwon-si (KR); Sang Joon Kim, Suwon-si (KR); Sung Ryung Park, Suwon-si (KR); Ho Young Joo, Suwon-si (KR); Sang Eun Park, Suwon-si (KR); Hwan Jun Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/282,617

(22) Filed: Feb. 22, 2019

(65) Prior Publication Data

US 2020/0077000 A1 Mar. 5, 2020

(30) Foreign Application Priority Data

Aug. 28, 2018 (KR) .......................... 10-2018-0101244

(51) Int. Cl.
*H04N 5/225* (2006.01)
*G02B 13/16* (2006.01)
(Continued)

(52) U.S. Cl.
CPC ............. *H04N 5/2257* (2013.01); *G03B 9/10* (2013.01); *G03B 17/02* (2013.01); *H04N 5/2252* (2013.01);
(Continued)

(58) Field of Classification Search
CPC .... H04N 5/238; H04N 5/2252; H04N 5/2253; H04N 5/2254; H04N 5/2257; G03B 9/04;
(Continued)

(56) References Cited

U.S. PATENT DOCUMENTS 6,903,777 B1 * 6/2005 Arisaka .................... G03B 9/02
348/362
9,807,312 B1 * 10/2017 Kim ........................ H04N 5/238
(Continued)

FOREIGN PATENT DOCUMENTS

CN 110471237 A 11/2019
CN 209946607 U 1/2020
(Continued)

OTHER PUBLICATIONS

Korean Office Action dated Nov. 18, 2019 in the corresponding Korean Patent Application No. 10-2018-0101244 (7 pages in English, 6 pages in Korean).
(Continued)

Primary Examiner — Kelly L Jerabek
(74) Attorney, Agent, or Firm — NSIP Law

(57) ABSTRACT

A camera module includes a housing having a lens module, an aperture module provided above the lens module and including blades that form incident holes having different sizes in multiple stages or successively, a moving part configured to linearly reciprocate to drive the blades, including a driving magnet facing a driving coil, a position sensor configured to sense a position of the moving part according to interaction with the driving magnet, and a controller configured to receive a signal from the position sensor and confirm or correct the position of the moving part.

21 Claims, 16 Drawing Sheets

(51) Int. Cl.
*G03B 17/02* (2006.01)
*G03B 9/10* (2006.01)

(52) U.S. Cl.
CPC ......... *H04N 5/2253* (2013.01); *H04N 5/2254* (2013.01); *G03B 2217/002* (2013.01)

(58) Field of Classification Search
CPC ... G03B 9/02; G03B 9/06; G03B 9/07; G03B 7/00; G03B 7/006; G03B 7/003; G02B 5/005
See application file for complete search history.

(56) References Cited

U.S. PATENT DOCUMENTS

| | | | | |
|---|---|---|---|---|
| 2006/0002702 | A1* | 1/2006 | Masuda | G03B 9/06 396/510 |
| 2011/0176053 | A1* | 7/2011 | Knoedgen | G03B 9/10 348/367 |
| 2017/0324892 | A1 | 11/2017 | Kim et al. | |
| 2019/0049692 | A1* | 2/2019 | Choi | G02B 7/08 |
| 2019/0346749 | A1 | 11/2019 | Seo | |
| 2019/0373145 | A1* | 12/2019 | Yu | G03B 9/02 |
| 2019/0377239 | A1* | 12/2019 | Lee | G03B 9/06 |
| 2020/0012170 | A1* | 1/2020 | Hong | G03B 7/003 |

FOREIGN PATENT DOCUMENTS

| | | |
|---|---|---|
| IN | 201914011778 A | 11/2019 |
| KR | 10-2012-0133910 A | 12/2012 |
| KR | 10-2014-0146919 A | 12/2014 |
| KR | 10-1700771 B1 | 1/2017 |
| KR | 10-2018-0088320 A | 8/2018 |
| KR | 10-2018-0092206 A | 8/2018 |
| KR | 10-2019-0129656 A | 11/2019 |

OTHER PUBLICATIONS

Korean Patent Application No. 10-2018-0053688 filed on May 10, 2018, incorporated by reference in specification (unpublished) (one of two Korean priority applications of US 2019/0346749 A1, and domestic (Korean) priority application of KR 10-2019-0129656 A) (no English translation) (counterpart of US 2019/0346749 A1).

* cited by examiner

CAMERA MODULE

CROSS-REFERENCE TO RELATED APPLICATION

This application claims the benefit under 35 USC 119(a) of Korean Patent Application No. 10-2018-0101244 filed on Aug. 28, 2018, in the Korean Intellectual Property Office, the entire disclosure of which is incorporated herein by reference for all purposes.

BACKGROUND

1. Field

This application relates to a camera module including an aperture module.

2. Description of the Background

Recently, camera modules have been basically adopted for use in portable electronic devices such as smartphones, tablet PCs, notebook computers, and the like. General digital cameras include a mechanical aperture to change an amount of incident light according to image capturing environments. However, camera modules used in small products such as portable electronic devices may be difficult to provide with a separate aperture due to structural characteristics thereof and spatial limitations.

For example, various components for driving the aperture may increase the weight of the camera module that degrades an autofocusing function. Further, when the aperture itself is provided with a power connection part such as a coil, or the like, for driving the aperture, the power connection part may be obstructive when a lens moves up and down during autofocus adjustment.

Further, since aperture modules having various diameters must be installed in a narrow space, it may not be possible to confirm whether a driving part has realized a correct diameter at an accurate position.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a housing having a lens module, an aperture module disposed above the lens module and comprising a plurality of blades that form incident holes having different sizes in multiple stages or successively, a moving part configured to linearly reciprocate to move at least a portion of the blades, including a driving magnet facing a driving coil, a position sensor configured to sense a position of the moving part according to interaction with the driving magnet, and a controller configured to receive a signal from the position sensor and confirm or correct the position of the moving part.

The position sensor may be disposed inside or on a side surface of the driving coil.

The position sensor may be a Hall sensor.

The plurality of blades may be three or more blades.

The plurality of blades may form N number of incident holes having different sizes in multiple stages, where N is a natural number.

N may be a natural number of 3 or greater.

The moving part may be fixed to N number of positions along a movement path.

The aperture module may include a base and the moving part may be movable along a side surface thereof. The camera module may further include a yoke disposed in the lens module or the base to face the driving magnet.

The yoke may include N number of yokes, and the N number of yokes may be disposed at intervals along the movement path of the moving part.

The yoke may be disposed extending along the movement path of the moving part.

The yoke may include N number of extended portions and other portions, wherein each extended portion has a height in an optical axis direction facing the driving magnet greater than a height of the other portions.

The plurality of blades may be three blades, and at least one of the three blades may have a section maintained in a fixed state, while the moving part moves.

The plurality of blades may be four blades, and at least one of the four blades may have a section maintained in a fixed state, while the moving part moves.

A portable electronic apparatus may include the camera module of claim 1 further configured to convert light incident through the lens module to an electrical signal, and a display unit disposed on a surface of the portable electronic apparatus to display an image based on the electrical signal.

In another general aspect, a camera module includes a housing having a lens module, an aperture module disposed above the lens module and forming N number of incident holes having different sizes by a plurality of blades, an aperture driving part provided such that a moving part, including a driving magnet facing a driving coil, linearly reciprocates, and a yoke provided to face the driving magnet, wherein the moving part may be fixed to N number of positions along a movement path.

The yoke may be disposed in the lens module.

The aperture module may include a base and the moving part may be movable along a side surface thereof, and the yoke may be disposed in the base to face the driving magnet.

In another general aspect, an aperture module includes blades having overlapping through holes in an optical axis direction and disposed rotatably on a base, a holding yoke, a moving part coupled to the blades, configured to slide linearly relative to the base to rotate at least one of the blades to change an aperture diameter of the overlapping through holes, and including a magnet, wherein attraction between the yoke and the magnet stably holds the moving part in two or more positions spaced apart linearly corresponding to predetermined aperture diameters.

The holding yoke is disposed on the base.

The aperture module may further include a driving coil facing the magnet configured to drive the magnet to the two or more positions, a sensor configured to sense a position of the moving part according to interaction with the magnet, and a controller configured to control the moving part to stay or slide linearly relative to the base in response to a signal from the sensor.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
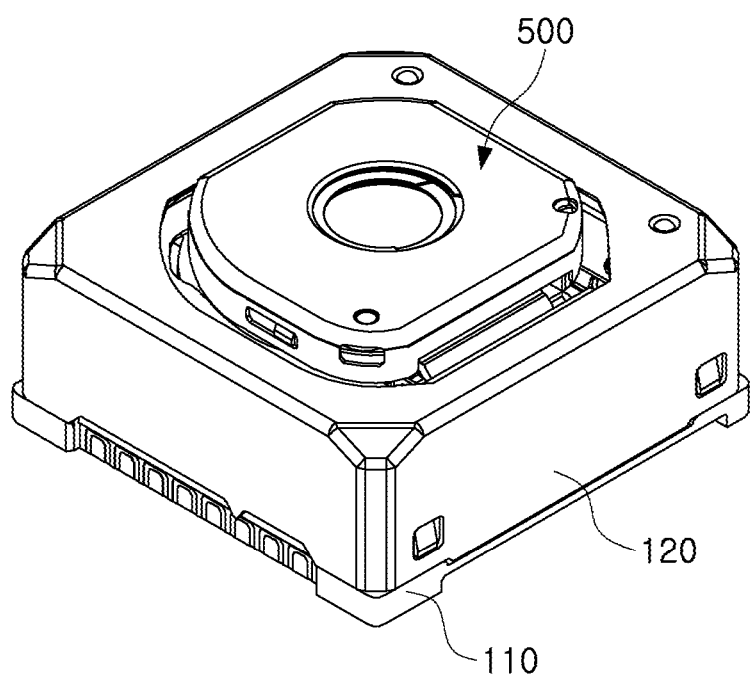
FIG. 1 is a perspective view of a camera module according to one or more embodiments in the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

Herein, it is noted that use of the term "may" with respect to an example, for example, as to what an example may include or implement, means that at least one example exists in which such a feature is included or implemented while all examples are not limited thereto.

An aspect of the present disclosure may provide a camera module capable of minimizing an increase in weight due to employment of an aperture module and accurately realizing various aperture diameters by fixing a driving part in an accurate position.

A camera module according to one or more embodiments in the present disclosure may be installed in a portable electronic device such as a mobile communication terminal, a smartphone, a tablet PC, a smartwatch, another wearable device, a vehicular device, and the like.

Figure 2:
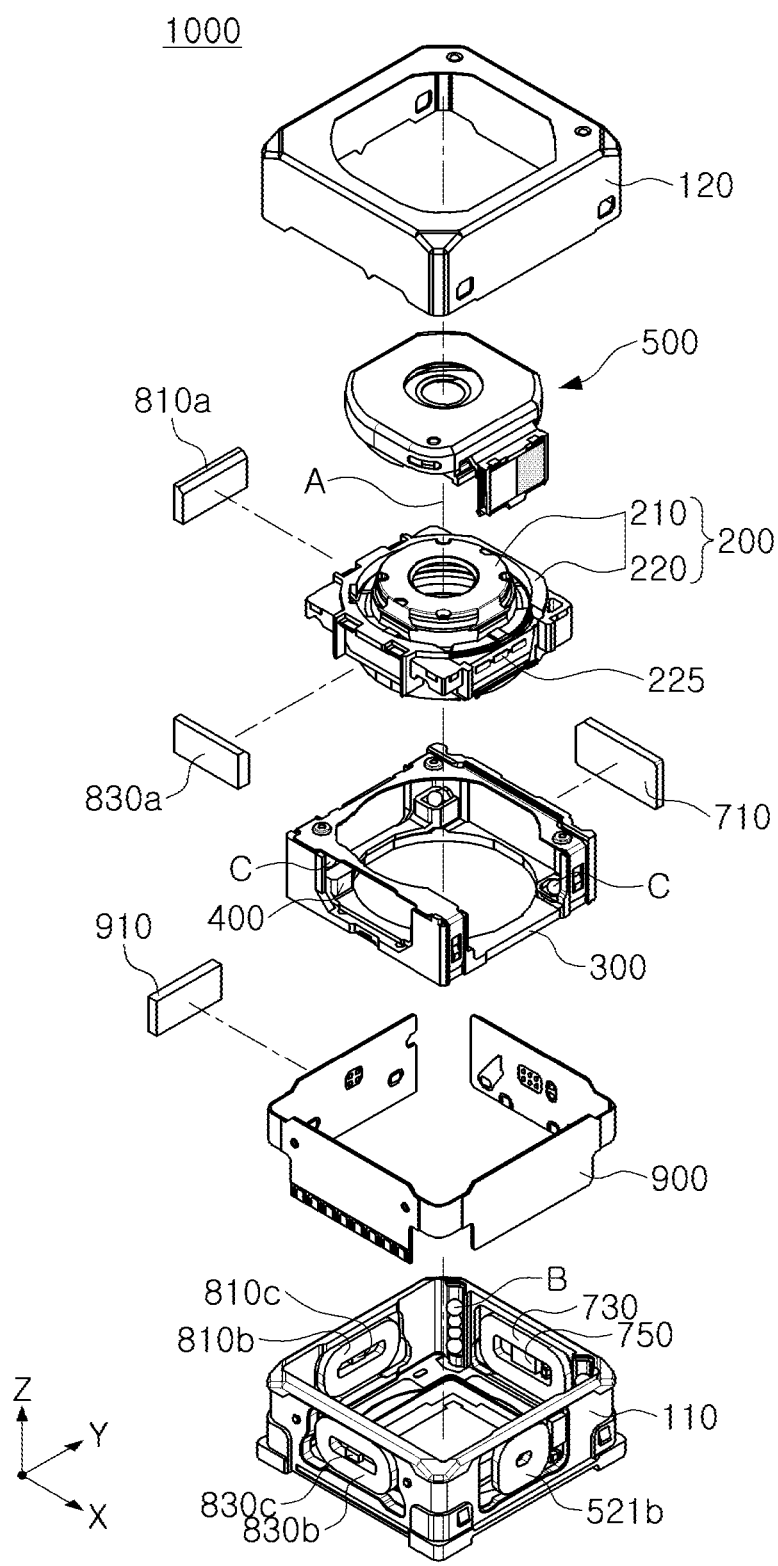
FIG. 2 is an exploded perspective view of a camera module according to one or more embodiments in the present disclosure.
Figure 3:
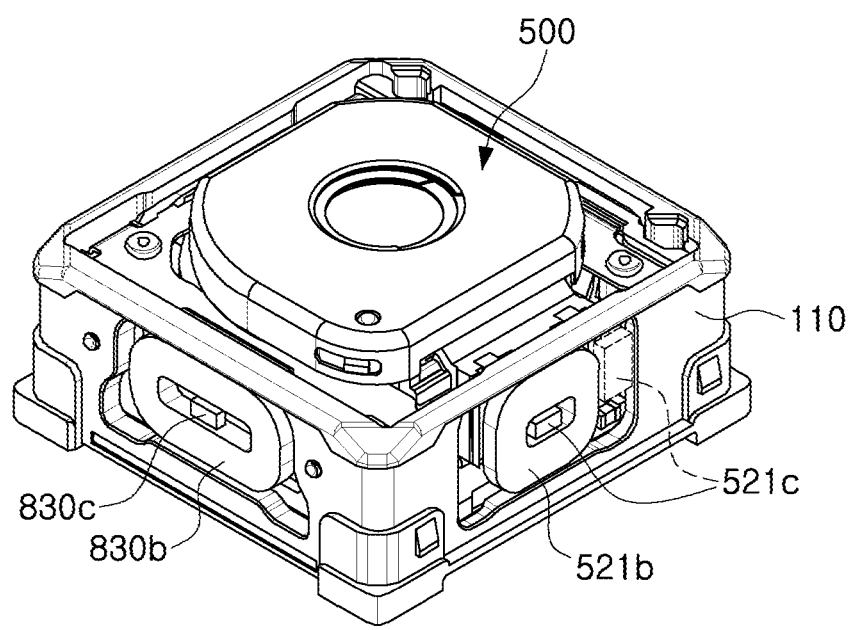
FIG. 3 is a partial perspective view of a camera module according to one or more embodiments in the present disclosure.

FIG. 1 is a perspective view of a camera module according to one or more examples described herein, FIG. 2 is an exploded perspective view of a camera module according to one or more examples described herein, and FIG. 3 is a partial perspective view of a camera module according to one or more examples described herein.

Referring to FIGS. 1 to 3, a camera module 1000 in the examples disclosed herein includes a lens module 200, a carrier 300, a guide part 400, an aperture module (or an iris module) 500, a housing 110, and a case 120.

The lens module 200 may include a lens barrel 210 having a lens, or a plurality of lenses, for imaging a subject and a holder 220 accommodating the lens barrel 210. The lens or plurality of lenses may be disposed inside the lens barrel 210 along an optical axis. The optical axis may be disposed in a Z-axis direction, for example, as designated by "A" in FIG. 2. The lens module 200 may be accommodated in the carrier 300.

The lens module 200 is movable in an optical axis direction for focus adjustment. For example, the lens module 200 may be moved, together with the carrier 300, in the optical axis direction by a focus adjusting part.

The focus adjusting part includes a magnet 710 generating a driving force (or power) in the optical axis direction and a coil 730 (e.g., an autofocus driving coil). In addition, the focus adjusting part may have a position sensor 750, e.g., a Hall sensor, for sensing a position of the lens module, i.e., a position of the carrier 300, in the optical axis direction.

The magnet 710 is mounted on the carrier 300. For example, the magnet 710 may be mounted on one surface of the carrier 300.

The coil 730 and the position sensor 750 are mounted on the housing 110. For example, the coil 730 and the position sensor 750 may be fixed to the housing 110 to face the magnet 710. The coil 730 and the position sensor 750 may be provided on a board 900 and the board 900 may be mounted on the housing 110.

The magnet 710 is a movable member that is mounted on the carrier 300 and moves together with the carrier 300 in the optical axis direction and the coil 730 and the position sensor 750 are stationary members fixed to the housing 110.

When power is applied to the coil 730, the carrier 300 may be moved in the optical axis direction by an electromagnetic influence between the magnet 710 and the coil 730. The position sensor 750 may sense the position of the carrier 300 in the optical axis direction.

Since the lens module 200 is accommodated in the carrier 300, the lens module 200 is also moved in the optical axis direction together with the carrier 300 according to movement of the carrier 300.

A rolling member B is disposed between the carrier 300 and the housing 110 to reduce frictional contact between the carrier 300 and the housing 110 when the carrier 300 is moved. The rolling member B may be in the form of a ball.

The rolling member B is disposed on both sides of the magnet 710 (or the coil 730).

A yoke may be mounted on the board 900. For example, the yoke may be disposed to face the magnet 710 with the coil 730 interposed therebetween.

Attraction acts between the yoke and the magnet 710 in a direction perpendicular to the optical axis direction, for example, in the Y-axis direction.

Thus, the rolling member B may be maintained to be in contact with the carrier 300 and the housing 110 due to the attraction between the yoke and the magnet 710.

The yoke also serves to allow a magnetic force of the magnet 710 to be focused. Thus, it is possible to prevent the occurrence of a leakage magnetic flux.

For example, the yoke and the magnet 710 form a magnetic circuit.

Meanwhile, in order to correct image shaking due to a user's hand motion, or the like, the lens module 200 may be moved in a first direction (e.g., X-axis direction) perpendicular to the optical axis (Z-axis direction) and in a second direction (e.g., Y-axis direction) perpendicular to the optical axis and the first direction.

For example, when shaking occurs due to a user's hand motion when an image is captured, a shake correction part provides the lens module 200 with a relative displacement corresponding to the shaking to compensate for the shaking.

The guide part 400 is accommodated in the carrier 300 such that the guide part 400 is mounted at an upper portion of the carrier 300 in the optical axis direction. The holder 220 is mounted on the guide part 400. A ball member C serving as a rolling bearing may be disposed between the carrier 300 and the guide part 400 in the optical axis direction and another ball member C serving as a rolling bearing may be disposed between the guide part 400 and the holder 220 in the optical axis direction.

When the lens module 200 is moved in the first direction and the second direction perpendicular to the optical axis, the guide part 400 guides the lens module 200.

For example, the lens module 200 is relatively moved in the first direction with respect to the guide part 400, and the guide part 400 and the lens module 200 may be moved together in the second direction in the carrier 300. That is, the guide part 400 and the lens module 200 may be relatively moved together in the second direction with respect to the carrier 300.

The shake correction part includes a plurality of magnets 810a and 830a and a plurality of coils 810b and 830b, i.e., first and second optical image stabilization (OIS) driving coils, respectively, which generate a driving force for shake correction. In addition, the shake correction part may include a plurality of position sensors 810c and 830c, e.g., Hall sensors, to sense positions of the lens module 200 in the first direction and the second direction.

Among the plurality of magnets 810a and 830a and the plurality of coils 810b and 830b, some magnet 810a and some coil 810b are disposed to face each other in the first direction to generate a driving force in the second direction, and the other magnet 830a and the other coil 830b are disposed to face each other in the second direction to generate a driving force in the first direction.

The plurality of magnets 810a and 830a are mounted on the lens module 200 and the plurality of coils 810b and 830b and the plurality of position sensors 810c and 830c facing the plurality of magnets 810a and 830a are fixed to the housing 110. For example, the plurality of coils 810b and 830b and the plurality of position sensors 810c and 830c are provided on the board 900 and the board 900 is mounted on the housing 110.

The plurality of magnets 810a and 830a are movable members which move together with the lens module 200 in the first direction and the second direction and the plurality of coils 810b and 830b and the plurality of position sensors 810c and 830c are stationary members fixed to the housing 110.

In the present disclosure, the ball member C supporting the guide part 400 and the lens module 200 is provided. The ball member C serves to guide the guide part 400 and the lens module 200 during a shake correction process.

The ball member C may be provided between the carrier 300 and the guide part 400, between the carrier 300 and the lens module 200, and between the guide part 400 and the lens module 200.

When a driving force is generated in the first direction, the ball member C disposed between the carrier 300 and the guide part 400 and between the carrier 300 and the lens module 200 is moved in a rolling manner in the first direction. Accordingly, the ball member C guides movement of the guide part 400 and the lens module 200 in the first direction.

When the driving force is generated in the second direction, the ball member C disposed between the guide part 400 and the lens module 200 and between the carrier 300 and the lens module 200 moves in a rolling manner in the second direction. Accordingly, the ball member C guides movement of the lens module 200 in the second direction.

The lens module 200 and the carrier 300 are accommodated in the housing 110. For example, the housing 110 has a shape in which upper and lower portions thereof are open, and the lens module 200 and the carrier 300 are accommodated in an inner space of the housing 110.

A printed circuit board (PCB) equipped with an image sensor may be disposed below the housing 110.

The case 120 is coupled to the housing 110 to enclose an outer surface of the housing 110 and serves to protect internal components of the camera module. In addition, the case 120 may serve to shield electromagnetic waves.

For example, the case 120 may shield the electromagnetic waves generated in the camera module so that the electromagnetic waves do not affect other electronic components in the portable electronic device.

In addition, since the portable electronic device is equipped with various electronic components in addition to the camera module, the case 120 may shield electromagnetic waves generated by the electronic components not to affect the camera module.

The case 120 may be formed of a metal and may be grounded to a ground pad provided on the PCB, thereby shielding electromagnetic waves.

The aperture module 500 is a device selectively changing an incident amount of light incident on the lens module 200.

For example, the aperture module 500 may include a plurality of incident holes having different sizes. Light may be incident through any one of the plurality of incidence holes according to image capture environments.

Figure 4:
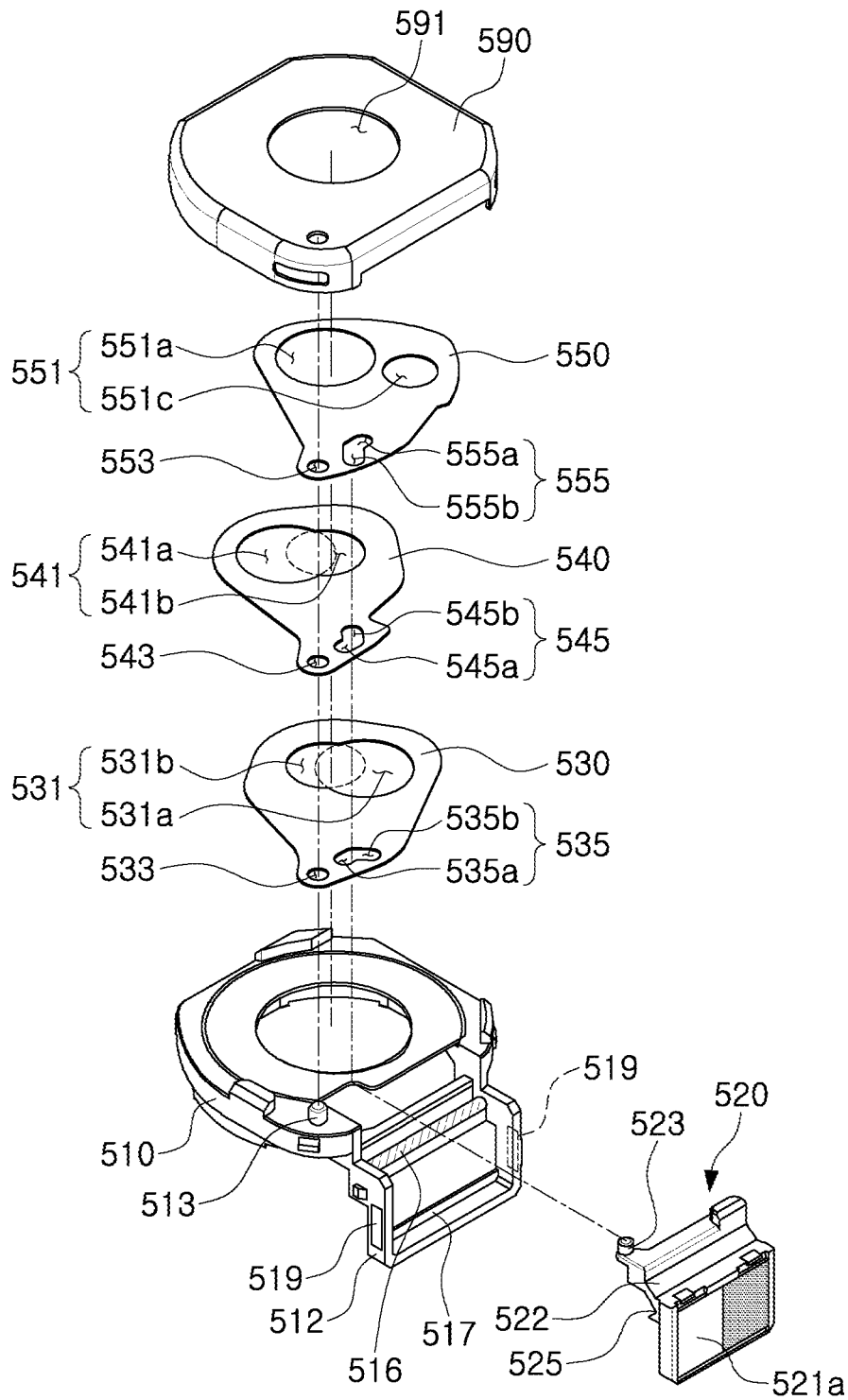
FIG. 4 is an exploded perspective view of an aperture module according to one or more embodiments in the present disclosure.
Figure 5A:
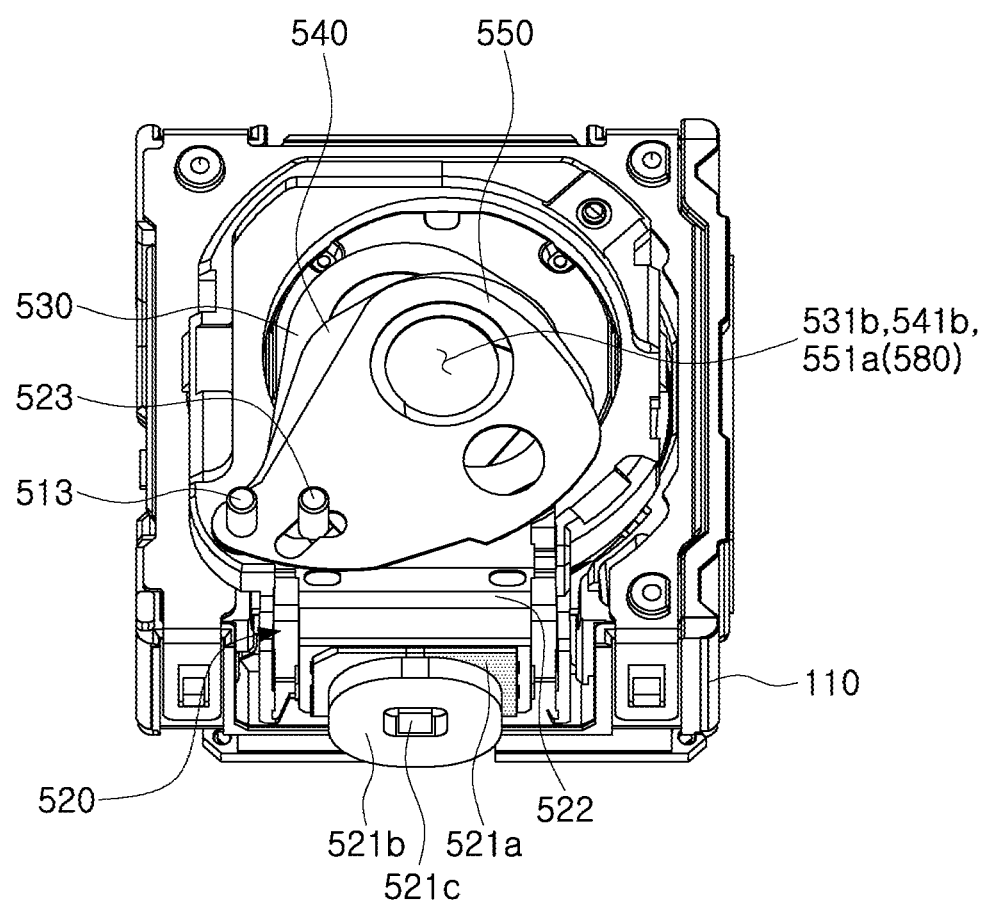
FIGS. 5A, 5B, and 5C are perspective views illustrating example states in which an example aperture module is driven to change a diameter of an incident hole.
Figure 5B:
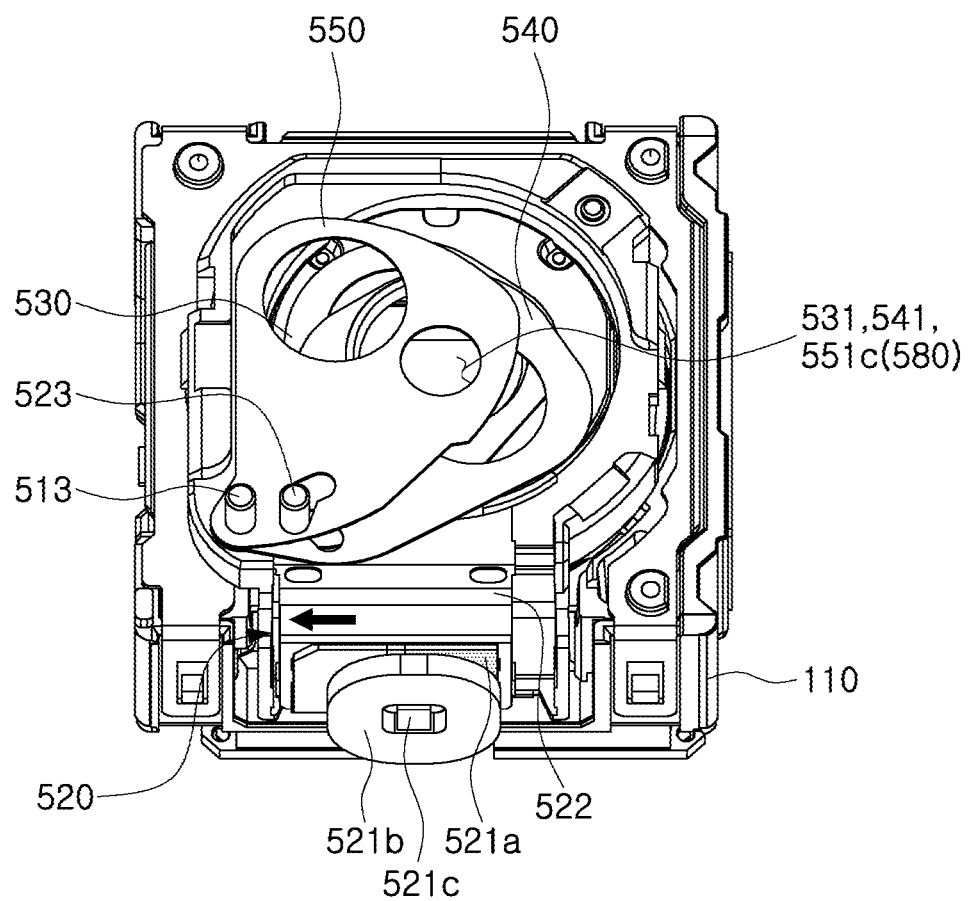
Figure 5C:
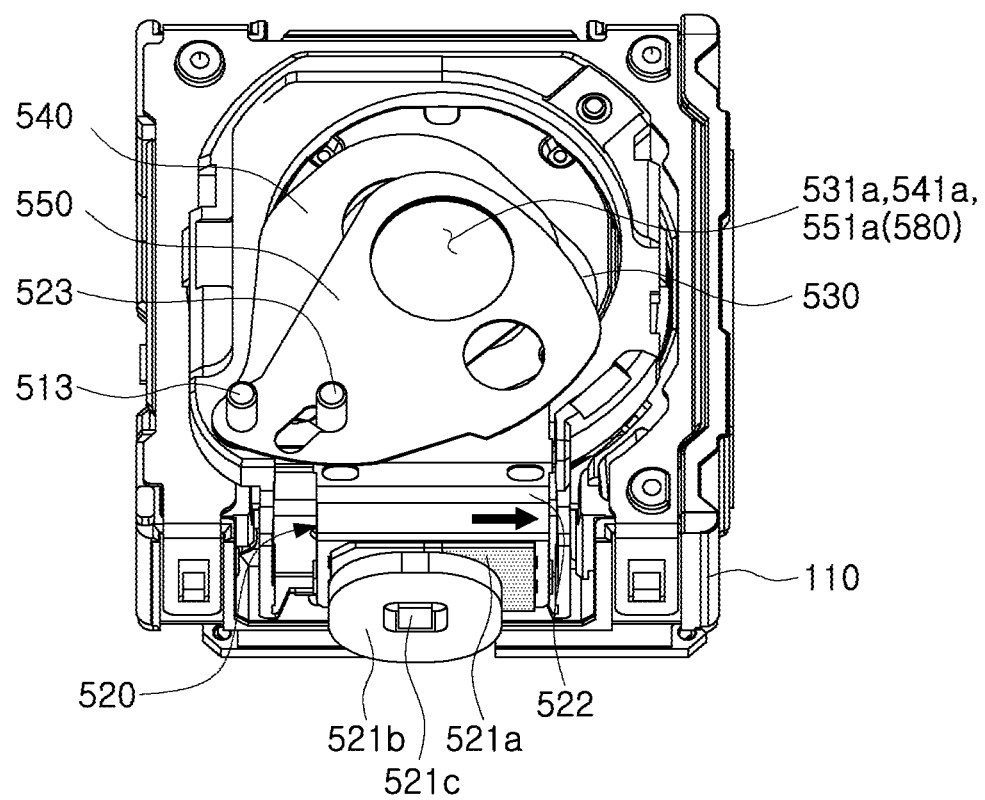

FIG. 4 is an exploded perspective view of an aperture module in the examples described herein, and FIGS. 5A through 5C are perspective views illustrating example states in which an example aperture module is driven to change a diameter of an incident hole.

In the aperture module 500 according to the examples described herein, at least three blades may be disposed in an overlapping manner, and at least three incident holes having different sizes may be formed by combining through holes provided in the blades. In illustrated embodiment, for example, a structure of forming three incident holes using three blades will be described. However, the present disclosure is not limited thereto and may also be applied to an aperture module capable of realizing three or more incident holes having different sizes using three or more blades disclosed in Korean Patent Application No. 10-2018-0053688, for example.

The aperture module 500 is coupled to the lens module 200 and selectively changes an incident amount of light incident on the lens module 200.

In a high illumination environment, a relatively small amount of light may be controlled to be incident on the lens module 200, and in a low illumination environment, a relatively large amount of light may be controlled to be incident on the lens module 200, and thus, quality of an image may be kept constant even under various conditions.

The aperture module 500 may be movable in the optical axis direction, the first direction, and the second direction in combination with the lens module 200. That is, the lens module 200 and the aperture module 500 are moved together when focus adjustment and shake correction are performed, so that a distance therebetween does not change.

Referring to FIG. 4, the aperture module 500 includes a base 510, first, second, and third blades 530, 540, and 550, and an aperture driving part (including a moving part 520 and a coil 521b). The aperture module 500 may also include a cover 590 covering the base 510 and the first to third blades 530, 540, and 550 and having a through hole 591 through which light is incident.

The first, second, and third blades 530, 540, and 550 may include first, second, and third through holes 531, 541, and 551, respectively. The first to third through holes 531, 541, and 551 may overlap each other in the optical axis direction to form incident holes 580 having different sizes.

Since the first to third blades 530, 540, and 550 slide in contact with each other, the first to third blades 530, 540, and 550 may have been subjected to an antistatic treatment not to cause frictional electricity.

The first, second, and third blades 530, 540, and 550 may have first, second, and third rotary shaft holes 533, 543, and 553 and first, second, and third driving shaft holes 535, 545, and 555, respectively. The first to third rotary shaft holes 533, 543, and 553 are fitted onto a first protrusion 513 of the base 510 to form a rotary shaft of the first to third blades 530, 540, and 550, and the first to third driving shaft holes 535, 545, and 555 are fitted onto a second protrusion 523 of the moving part 520, so that the first to third blades 530, 540, and 550 may rotate as the moving part 520 linearly moves.

The first to third rotary shaft holes 533, 543, and 553 have a round shape, and in a state in which the first protrusion 513 is fitted into the first to third rotary shaft holes 533, 543, and 553, the first protrusion 513 may serve only as a rotary shaft, without movement.

The first to third driving shaft holes 535, 545, and 555 may extend in at least one direction, and in a state in which the second protrusion 523 is fitted into the first to third driving shaft holes 535, 545, and 555, the second protrusion 523 may move in the holes. In the present example, only one second protrusion 523 is provided, but a plurality of second protrusions 523 may be provided, for example, the second protrusions 523 may be provided on both sides of the moving part 520. When two second protrusions 523 are provided, the driving shaft holes 535, 545, and 555 of the plurality of blades may be divided to be fitted onto the two second protrusions 523.

The first to third driving shaft holes 535, 545, and 555 may each include a section in which the driving shaft holes are parallel to a movement direction of the moving part 520 so that the blades do not rotate although the moving part 520, e.g., the second protrusion 523, moves in at least one section.

For example, the first driving shaft hole 535 includes a first section 535a and a second section 535b. The first section 535a and the second section 535b may communicate with each other and may be provided such that tilt directions thereof are changed at a point where the first section 535a and the second section 535b meet. The tilt direction of the first section 535a is substantially parallel to the movement direction of the moving part 520 so that the first blade 530 is maintained in a fixed state, without being rotated, while the moving part 520 is passing in the first section 535a. The tilt direction of the second section 535b is sloped with respect to the movement direction of the moving part 520 so that the first blade 530 may rotate while the moving part 520 is passing in the second section 535b.

The second driving shaft hole 545 includes a first section 545a and a second section 545b. The first section 545a and the second section 545b may communicate with each other and may be provided such that tilt directions thereof are changed at a point where the first section 545a and the second section 545b meet. The tilt direction of the first section 545a is substantially parallel to the movement direction of the moving part 520 so that the second blade 540 is maintained in a fixed state, without being rotated, while the moving part 520 is passing in the first section 545a. The tilt direction of the second section 545b is sloped with respect to the movement direction of the moving part 520 so that the second blade 540 may rotate while the moving part 520 is passing in the second section 545b.

The third driving shaft hole 555 includes a first section 555a and a second section 555b. The first section 555a and the second section 555b may communicate with each other and may be provided such that tilt directions thereof are changed at a point where the first section 555a and the second section 555b meet. The tilt direction of the first section 555a is substantially parallel to the movement direction of the moving part 520 so that the third blade 550 is maintained in a fixed state, without being rotated, while the moving part 520 is passing in the first section 555a. The tilt direction of the second section 555b is sloped with respect to the movement direction of the moving part 520 so that the third blade 550 may rotate while the moving part 520 is passing in the second section 555b.

As the linear movement of the moving part 520 is converted into a rotational movement, the first to third blades 530, 540 and 550 each rotate with respect to the first protrusion 513 which is a rotary shaft.

The first through hole 531 and the second through hole 541 may have a shape in which two through holes 531a and 531b and 541a and 541b having different diameters are connected to each other, and the third through hole 551 may have a shape in which two through holes 551a and 551c having different diameters are separately provided. In this exemplary embodiment, it is illustrated that three incident holes are formed by three blades. The first through hole 531 and the second through hole 541 may have a shape in which the through holes 531a and 541a having a relatively large diameter and through holes 531b and 541b having a relatively small diameter are connected to each other, and the third blade 550 may have a shape in which the through hole 551a having a large diameter and a through hole 551c having a very small diameter are separately provided. For example, the through hole 551a having a large diameter may have a diameter substantially the same or greater than the diameters of the relatively large diameter through holes 531a and 541a, and the through hole 551c having a very small diameter may have a diameter smaller than the diameters of the relatively small diameter through holes 531b and 541b.

The through holes 531a, 531b, 541a, 541b, 551a, and 551c may be round or polygonal. In particular, in the case of a polygonal through hole, the polygonal shape may be maintained when the aperture diameters are successively changed.

The first to third blades 530, 540 and 550 are coupled to the base 510 such that at least portions of the through holes overlap each other in the optical axis direction and are movable by the aperture driving part on the basis of the first protrusion 513 as a rotary shaft.

The first to third through holes 531, 541, and 551 may partially overlap to form a plurality of incident holes having different diameters. For example, portions of the first to third through holes 531, 541, and 551 may overlap to form incident holes 531a, 541a and 551a having a relatively large diameter, incident holes 531, 541, and 551c having a relatively small diameter (here, first or second through hole 531 or 541 at any position may be used), and incident holes 531b, 541b, and 551a having a relatively medium-sized diameter (the incident holes may have a round shape or a polygonal shape according to shapes of the first to third through holes 531, 541, and 551).

Light may be incident through any one of the plurality of incident holes having different sizes according to image capture environments.

Referring to FIG. 5A, when the moving part 520 is positioned at the substantially middle of the movement guide part 512 by the aperture driving part, the first to third blades 530, 540, and 550 may rotate on the basis of the first protrusion 513 as a shaft and portions of the first to third through holes 531, 541, and 551 may overlap each other to form the incident holes 531b, 541b, and 551a having a relatively medium-sized diameter.

Referring to FIG. 5B, when the moving part 520 is positioned at one side (the left side in FIG. 5B) of the movement guide part 512 by the aperture driving part, the first to third blades 530, 540, and 550 may rotate on the basis of the first protrusion 513 as a shaft and portions of the first to third through holes 531, 541, and 551 may overlap each other to form the incident holes 531, 541, and 551c having the smallest diameter. Here, the first and second through holes 531 and 541 may be designed regardless of position. For example, the largest portions 531a and 541a of the first and second through holes 531 and 541 may be aligned with the portion 551c in the optical axis, the small portions 531b and 541b may be aligned with the portion 551c in the optical axis, or intermediate portions thereof may be utilized.

Referring to FIG. 5C, when the moving part 520 is positioned on the other side (the right side in FIG. 5C) of the movement guide part 512 by the aperture driving part, the first to third blades 530, 540, and 550 may rotate on the basis of the first protrusion 513 as a shaft and portions of the first to third through holes 531, 541, and 551 may overlap each other to form the incident holes 531a, 541a, and 551a having the largest diameter.

The aperture driving part includes the moving part 520 disposed on the base 510 so as to be movable in a direction perpendicular to the optical axis direction and the coil (aperture driving coil) 521b fixed to the housing 110 to face the moving part 520. The coil 521b is provided on the board 900, and the board 900 is fixed to the housing 110. The board 900 may be electrically connected to the PCB attached to the bottom of the camera module 1000.

The present example may use a closed loop control scheme of sensing a position of the moving part 520 and feeding the same back when the moving part 520 is linearly moved. Thus, a position sensor 521c may be provided for the closed loop control. The position sensor 521c may be installed at the center of the coil 521b to face a magnet 521a (i.e., 521c indicated by the solid line in the illustration of the drawing) or on the side surface (i.e., 521c indicated by the dotted line in the illustration of the drawing). The position sensor 521c may be installed on the board 900 and may be a Hall sensor (Hall IC).

The position sensor 521c may sense the position of the moving part 520 by interaction with the driving magnet 521a. A controller 910 may receive a signal from the position sensor 521c and may determine whether the moving part 520 is at a position realizing an accurate size of the incident hole. After determining the position, the controller 910 may confirm or instruct to correct the position of the moving part 520. That is, the controller 910 may 1) instruct to apply power to the driving coil 521b to move the moving part 520 to a desired position, 2) receive a position of the moving part 520 from the position sensor 521c in real time, (3) confirm, when the moving part has moved accurately to an intended position, the corresponding position as a position of the moving part 520, and 4) additionally apply power to the driving coil 521b to additionally drive the driving part to move the moving part 520 to the intended position if the moving part 520 is not at the intended position.

The controller 910 is illustrated as disposed on the board 900 (FIG. 2); however, examples described herein are not so limited, and the controller 910 may be disposed elsewhere in the camera module 1000, for example, on the PCB disposed below the housing 110.

The moving part 520 is a movable member moving in the optical axis direction, the first direction, and the second direction together with the base 510, and the coil 521b is a stationary member fixed to the housing 110.

Since the coil 521b providing a driving force to the aperture module 500 is disposed outside the aperture module 500, i.e., on the housing 110 of the camera module, the weight of the aperture module 500 may be reduced.

In other words, since the coil 521b providing a driving force to the aperture module 500 is provided as a stationary member, the coil 521b is not moved during autofocus adjustment or handshake correction driving, and thus, an increase in weight of the lens module 200 due to the adoption of the lens module 500 may be minimized.

Since the coil 521b for providing driving force to the aperture module 500 is disposed in the housing 110 which is the stationary member and is electrically connected to the PCB, although the lens module 200 and the aperture module 500 are moved during autofocusing adjustment or shake correction, the movement of the lens module 200 and the aperture module 500 does not affect the coil 521b of the aperture driving part. Thus, a degradation of the autofocusing adjustment function may be prevented.

The base 510 has the movement guide part 512 in which the moving part 520 is disposed. The movement guide part 512 may have a shape protruding from the base 510 in the optical axis direction. In addition, the movement guide part 512 may have a square frame shape so that the moving part 520 may be easily seated.

The moving part 520 includes the magnet 521a disposed to face the coil 521b and a magnet holder 522 to which the magnet 521a is attached. The magnet 521a is provided to face the coil 521b in a direction perpendicular to the optical axis direction.

The moving part 520 is disposed at the movement guide part 512 of the base 510. The base 510 may have a rod member 516 supporting the moving part 520 to facilitate sliding movement of the moving part 520. In addition, the moving part 520 may have an insertion recess 525 to allow the rod member 516 to be inserted therein.

The rod member 516 may have a round rod shape or a plate shape to facilitate sliding and the insertion recess 525 may have a circumferential shape having a diameter smaller than that of the rod member 516 or a polygonal shape (not shown) so as to be in line contact with the rod member 516 to reduce a frictional force.

In addition, when only the rod member 516 is in contact with the moving part 520, fixing of the moving part 520 may be unstable to lead to tilting, and thus, a support part may be additionally provided in a portion spaced apart from the rod member 516. For example, a guide blade 517 may be provided at an end portion of the movement guide part 512 so as to be substantially parallel to the rod member 516.

The base 510 may have the first protrusion 513 which passes through the first to third rotary shaft holes 533, 543, and 553 of the first to third blades 530, 540, and 550. The first to third blades 530, 540, and 550 rotate about the first protrusion 513.

The magnet holder 522 has the second protrusion 523 passing through the first to third blades 530, 540, and 550. The second protrusion 523 may pass through the first to third driving shaft holes 535, 545, and 555 of the first to third blades 530, 540, and 550.

The movement guide part 512 may have holding yokes 519 at positions of both side surfaces of the magnet 521a facing each other.

The lens module 200 (more specifically, the holder 220) may have a yoke 225 at a position facing the magnet 521a.

The moving part 520 may slide, while maintaining a state in which the moving part 520 is in close contact with the movement guide part 512 due to attraction between the yoke 225 and the magnet 521a.

The moving part 520 in the present example may move in a direction perpendicular to the optical axis direction and the first to third blades 530, 540, and 550 may rotate according to movement of the moving part 520 to change sizes of the incident hole in three stages (large, medium, small) or successively.

When the moving part 520 moves to one end of the movement guide part 512 in the direction perpendicular to the optical axis direction, the size of the incident hole is changed to three sizes (large, medium, and small) (N sizes, here, N is a natural number), and in this state, the moving part 520 may be maintained in a state of being fixed to three positions (N positions) of both ends and the middle of the movement guide part 512.

When the moving part 520 moves along the movement guide part 512 in the direction perpendicular to the optical axis direction, the yoke 225 may maintain the moving part 520 fixed at the three positions (N positions) by the attraction with the driving magnet 521a. That is, although power is not applied to the coil 521b, the moving part 520 may maintain the state of forming an incident hole having any one of large, medium, and small sizes in a state of being fixed in position by the attraction with the yoke 225 (or holding yoke).

Figure 6:
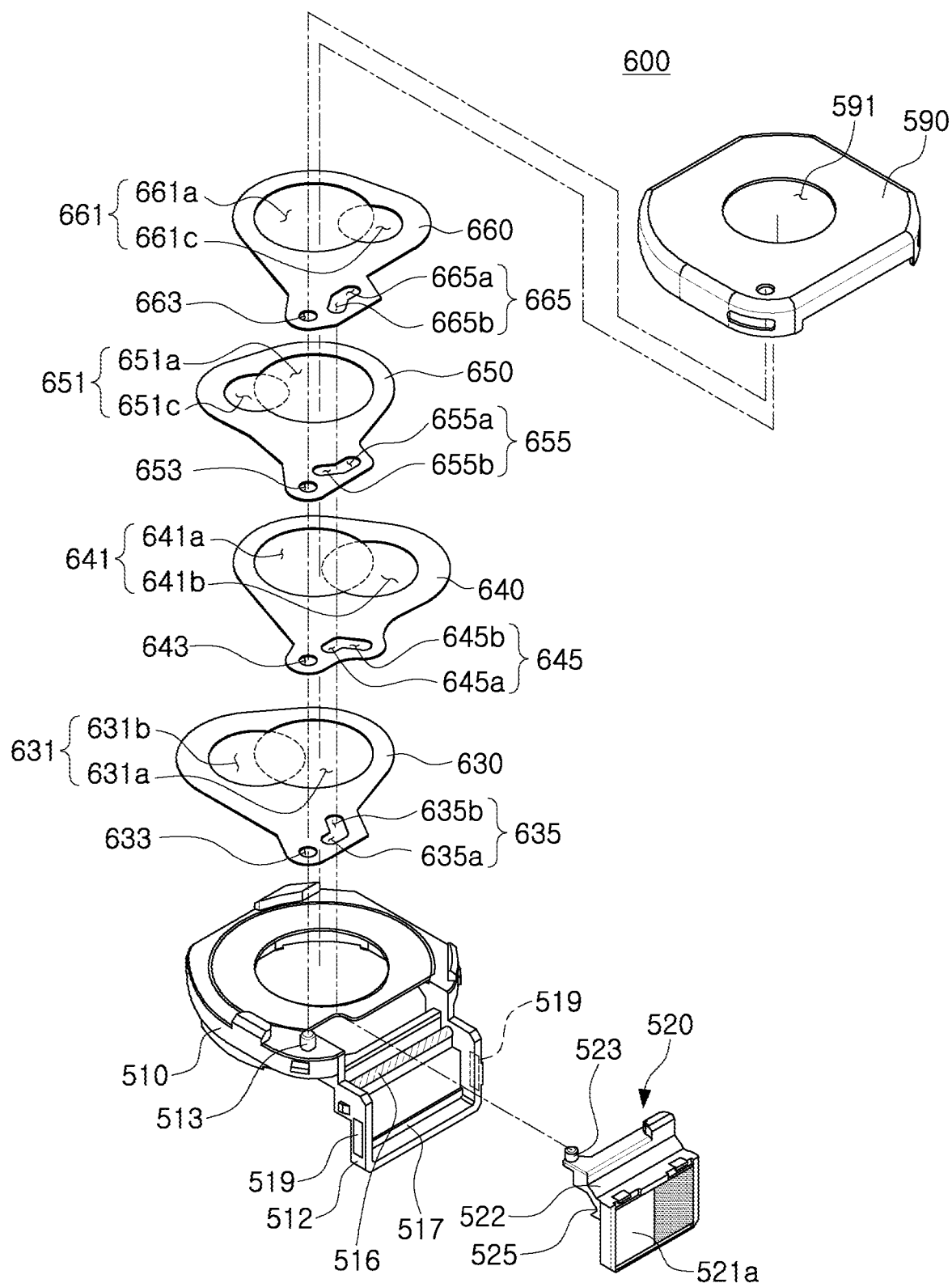
FIG. 6 is an exploded perspective view of an aperture module according to one or more other embodiments in the present disclosure.
Figure 7A:
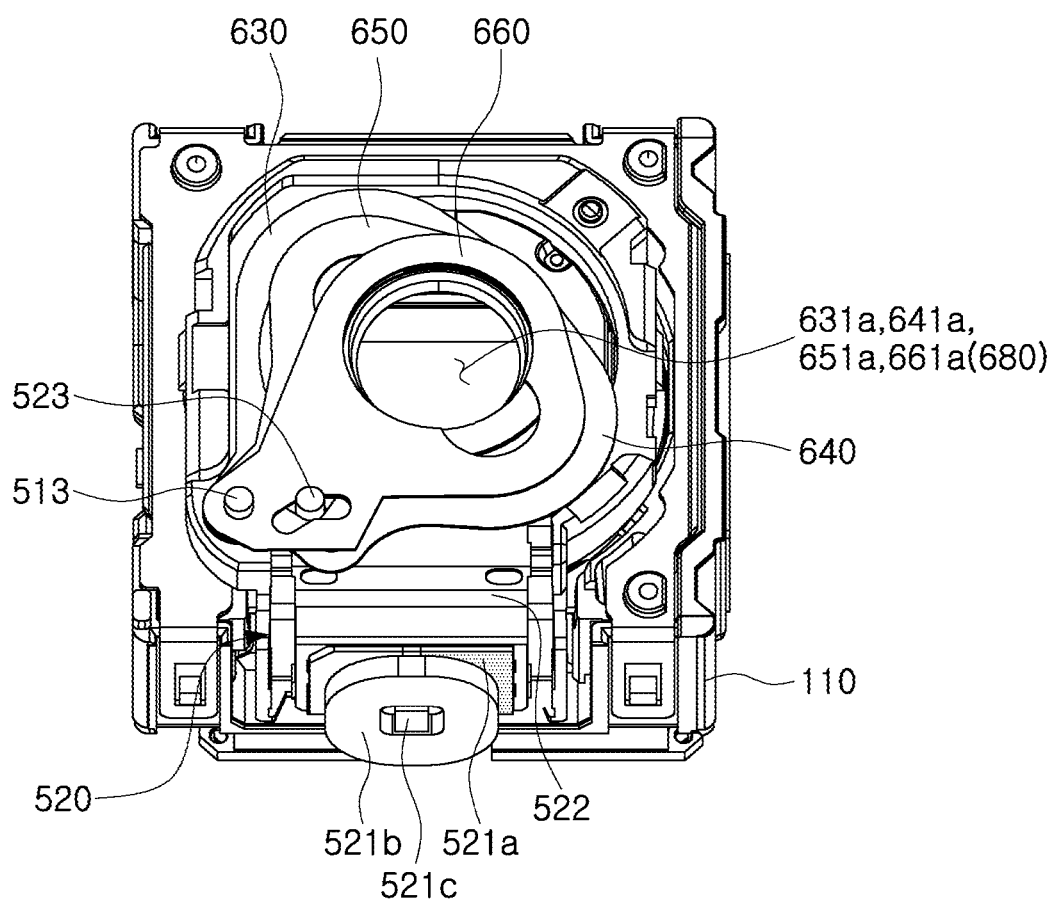
FIGS. 7A, 7B, and 7C are perspective views illustrating example states in which an example aperture module is driven to change a diameter of an incident hole.
Figure 7B:
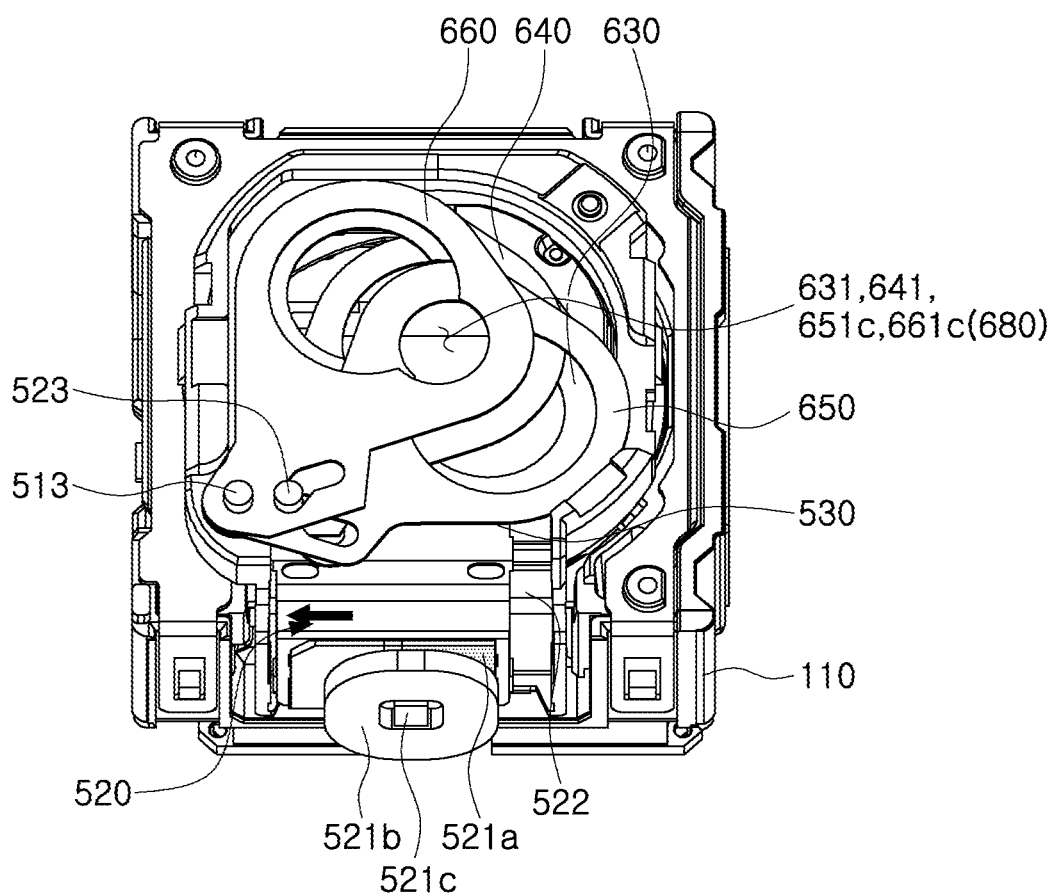
Figure 7C:
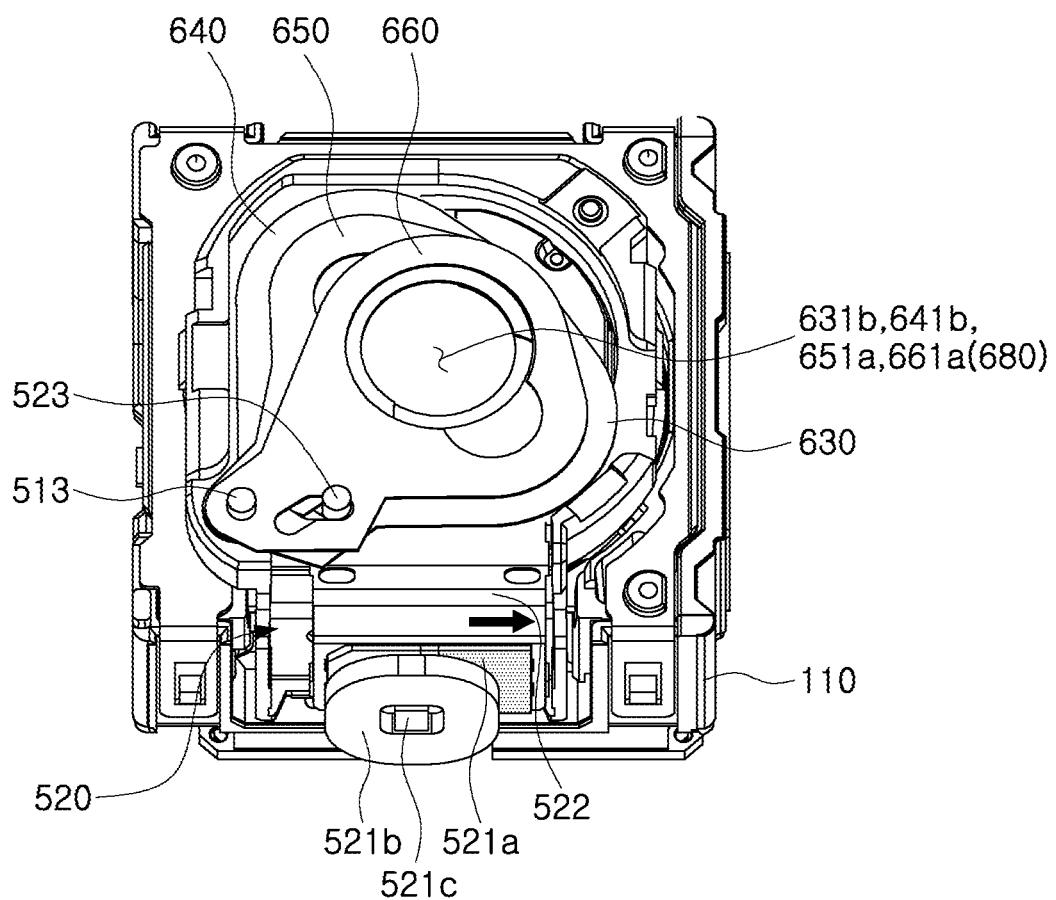

FIG. 6 is an exploded perspective view of an aperture module according to other examples described herein, and FIGS. 7A through 7C are perspective views illustrating example states in which an example aperture module is driven to change a diameter of an incident hole.

Referring to FIGS. 6 to 7C, an aperture module 600 may have four blades arranged in an overlapping manner and at least three incident holes having different sizes may be formed by combining the through holes provided in the four blades. The aperture module 600 in the present example has similar structures as that of the aperture module 500 according to the examples described above with reference to FIGS. 4 through 5C, except for the four blades, and thus, repetitive descriptions of the same or similar parts may be omitted with further description here focused on the structure of the blades for convenience.

Referring to FIG. 6, the aperture module 600 of the other examples described herein includes a base 510, first, second, third, and fourth blades 630, 640, 650, and 660, and an aperture driving part (including a moving part 520 and a coil 521b). The aperture module 600 may also include a cover 590 covering the base 510 and the first to fourth blades 630, 640, 650, and 660 and having a through hole 591 through which light is incident.

The first to fourth blades 630, 640, 650, and 660 may include first, second, third, and fourth through holes 631, 641, 651, and 661, respectively. The first to fourth through holes 631, 641, 651, and 661 overlap each other in an optical axis direction to form incident holes 680 having different sizes.

Since the first to fourth blades 630, 640, 650, and 660 slide in contact with each other, the first to fourth blades 630, 640, 650, and 660 may have been subjected to an antistatic treatment not to cause frictional electricity.

The first to fourth blades 630, 640, 650 and 660 may have first, second, third, and fourth rotary shaft holes 633, 643, 653, and 663 and first, second, third, and fourth driving shaft holes 635, 645, 655, and 665. The first to fourth rotary shaft holes 633, 643, 653, and 663 may be fitted onto the first protrusion 513 of the base 510 to form a rotary shaft of the first to fourth blades 630, 640, 650, and 660, and the first to fourth driving shaft holes 635, 645, 655, and 665 may be fitted onto the second protrusion 523 of the moving part 520, so that the first to fourth blades 630, 640, 650, and 660 may rotate as the moving part 520 linearly moves.

The first to fourth rotary shaft holes 633, 643, 653, and 663 may have a round shape, and in a state in which the first protrusion 513 is fitted into the first to fourth rotary shaft holes 633, 643, 653, and 663, the first protrusion 513 may serve only as a rotary shaft, without movement.

The first to fourth driving shaft holes 635, 645, 655, and 665 may extend in at least one direction, and in a state in which the second protrusion 523 is fitted into the first to fourth driving shaft holes 635, 645, 655, and 665, the second protrusion 523 may move in the holes.

The first to fourth driving shaft holes 635, 645, 655, and 665 may each include a section in which the driving shaft holes are parallel to a movement direction of the moving part 520 so that the blades do not rotate although the moving part 520 (e.g., the second protrusion 523) moves in at least one section.

For example, the first driving shaft hole 635 may include a first section 635a and a second section 635b, and the first section 635a and the second section 635b may communicate with each other and may be provided such that tilt directions thereof are changed at a point where the first section 635a and the second section 635b meet. The tilt direction of the first section 635a is substantially parallel to the movement direction of the moving part 520 so that the first blade 630 is maintained in a fixed state, without being rotated, while the moving part 520 is passing in the first section 635a. The tilt direction of the second section 635b is sloped with respect to the movement direction of the moving part 520 so that the first blade 630 may rotate while the moving part 520 is passing in the second section 635b.

The second driving shaft hole 645 may include a first section 645a and a second section 645b, and the first section 645a and the second section 645b may communicate with each other and may be provided such that tilt directions thereof are changed at a point where the first section 645a and the second section 645b meet. The tilt direction of the first section 645a is substantially parallel to the movement direction of the moving part 520 so that the second blade 640 is maintained in a fixed state, without being rotated, while the moving part 520 is passing in the first section 645a. The tilt direction of the second section 645b is sloped with respect to the movement direction of the moving part 520 so that the second blade 640 may rotate while the moving part 520 is passing in the second section 645b.

The third driving shaft hole 655 may include a first section 655a and a second section 655b, and the first section 655a and the second section 655b may communicate with each other and may be provided such that tilt directions thereof are changed at a point where the first section 655a and the second section 655b meet. The tilt direction of the first section 655a is substantially parallel to the movement direction of the moving part 520 so that the third blade 650 is maintained in a fixed state, without being rotated, while the moving part 520 is passing in the first section 655a. The tilt direction of the second section 655b is sloped with respect to the movement direction of the moving part 520 so that the third blade 650 may rotate while the moving part 520 is passing in the second section 655b.

The fourth driving shaft hole 665 may include a first section 665a and a second section 665b, and the first section 665a and the second section 665b may communicate with each other and may be provided such that tilt directions thereof are changed at a point where the first section 665a and the second section 665b meet. The tilt direction of the first section 665a is substantially parallel to the movement direction of the moving part 520 so that the fourth blade 660 is maintained in a fixed state, without being rotated, while the moving part 520 is passing in the first section 665a. The tilt direction of the second section 665b is sloped with respect to the movement direction of the moving part 520 so that the fourth blade 660 may rotate while the moving part 520 is passing in the second section 665b.

As the linear movement of the moving part 520 is converted into a rotational movement, the first to fourth blades 630, 640, 650, and 660 may each rotate with respect to the first protrusion 513 which is a rotary shaft.

The first to fourth through holes 631, 641, 651, and 661 may have a shape in which two through holes 631a and 631b, two through holes 641a and 641b, two through holes 651a and 651c, and two through holes 661a and 661c are connected to each other, respectively.

The first through hole 631 and the second through hole 641 may have a shape in which the through holes 631a and 641a having a relatively large diameter and the through holes 631b and 641b having a relatively medium-sized diameter are connected to each other, and the third through hole 651 and the fourth through hole 661 may have a shape in which through holes 651a and 661a having a relatively large diameter and through holes 651c and 661c having a relatively small diameter are connected to each other.

The through holes 631a, 631b, 641a, 641b, 651a, 651c, 661a, and 661c may be round or polygonal. In particular, in the case of a polygonal through hole, the polygonal shape may be maintained when the aperture diameters are successively changed.

The first to fourth blades 630, 640, 650, and 660 are coupled to the base 510 such that at least portions of the through holes overlap each other in the optical axis direction and are movable by the aperture driving part on the basis of the first protrusion 513 as a rotary shaft.

The first to fourth through holes 631, 641, 651, and 661 may partially overlap to form a plurality of incident holes 680 having different diameters. For example, portions of the first to fourth through holes 631, 641, 651, and 661 may overlap to form incident holes 631a, 641a, 651a, and 661a having a relatively large diameter, portions of the first to fourth through holes 631, 641, 651, and 661 may overlap to form incident holes 631, 641, 651c, 661c having a relatively small diameter (here, first or second through hole 631 or 641 at any position may be used), and portions of the first to fourth through holes 631, 641, 651, and 661 may overlap to form incident holes 631b, 641b, 651a, and 661a having a relatively medium-sized diameter (the incident holes 680 may have a round shape or a polygonal shape according to shapes of the first to fourth through holes 631, 641, 651, and 661).

Light may be incident through any one of the plurality of incident holes having different sizes according to image capture environments.

Referring to FIG. 7A, when the moving part 520 is positioned at the substantially middle of the movement guide part 512 by the aperture driving part, the first to fourth blades 630, 640, 650, and 660 may rotate on the basis of the first protrusion 513 as a shaft and portions of the first to fourth through holes 631, 641, 651, and 661 may overlap each other to form incident holes 631a, 641a, 651a, and 661a having the largest diameter.

Referring to FIG. 7B, when the moving part 520 is positioned at one side (the left side in FIG. 7B) of the movement guide part 512 by the aperture driving part, the first to fourth blades 630, 640, 650, and 660 may rotate on the basis of the first protrusion 513 as a shaft and portions of the first to fourth through holes 631, 641, 651, and 661 may overlap each other to form incident holes 631, 641, 651c, and 661c having the smallest diameter. Here, the first and second through holes 631 and 641 may be designed regardless of position. For example, the largest portions 631a and 641a of the first and second through holes 631 and 641 may be aligned with the portions 651c and 661c in the optical axis, the middle portions 631b and 641b may be aligned with the portions 651c and 661c in the optical axis, or intermediate portions thereof may be utilized.

Referring to FIG. 7C, when the moving part 520 is positioned on the other side (the right side in FIG. 7C) of the movement guide part 512 by the aperture driving part, the first to fourth blades 630, 640, 650, and 660 may rotate on the basis of the first protrusion 513 as a shaft and portions of the first to fourth through holes 631, 641, 651, and 661 may overlap each other to form incident holes 631b, 641b, 651a, and 661a having a relatively medium-sized diameter.

Meanwhile, referring to FIGS. 8 to 13, a yoke structure according to one or more embodiments in the present disclosure is described.

Figure 8:
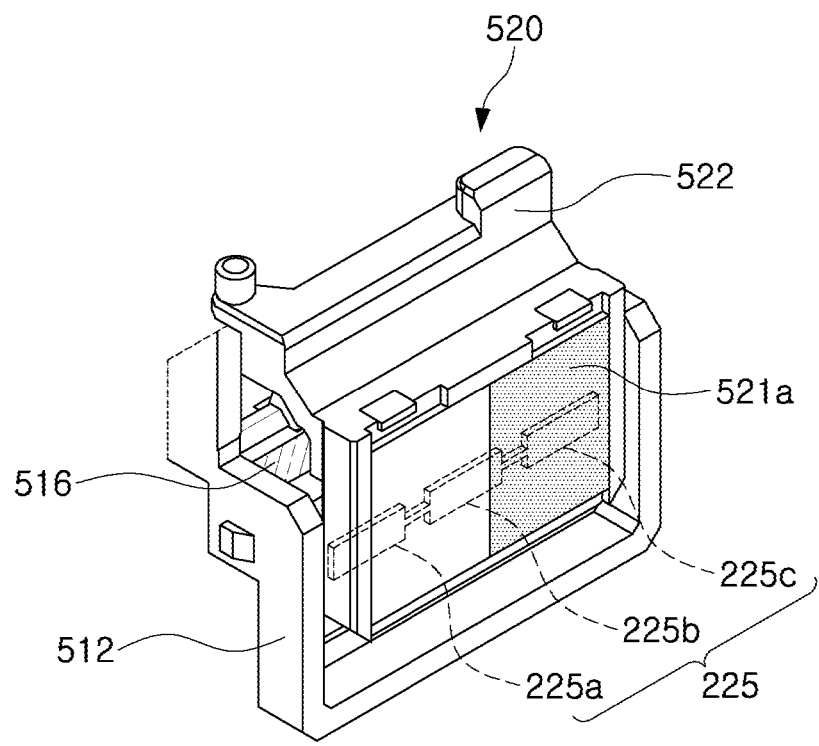
FIGS. 8, 9, and 10 are reference views illustrating a positional relationship between a yoke and a driving magnet according to one or more embodiments in the present disclosure.

As illustrated in FIG. 8, the yoke 225 according to the present example may have three extended portions 225a, 225b, and 225c each having a width in the optical axis direction larger than those of other portions to fix the moving part 520 to three (N) positions by attraction with the magnet 521a, and may be fixed to one side of the lens module 200.

Figure 9:
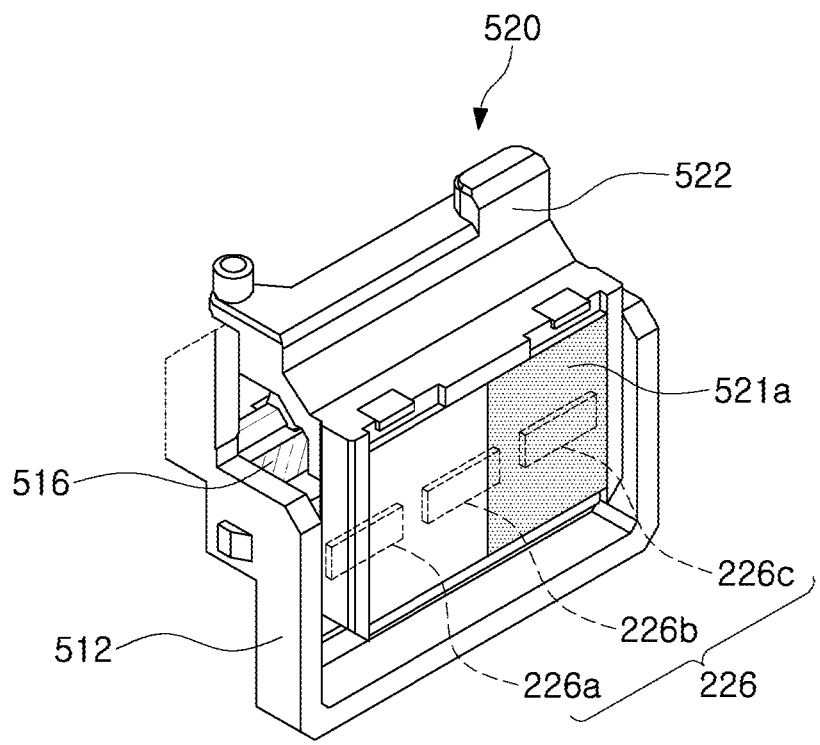

Alternatively, as illustrated in FIG. 9, a yoke 226 according to the present example may have three separate yokes (N separate yokes), i.e., first to third yokes 226a, 226b, and 226c, spaced apart from each other by a predetermined interval along a movement path of the moving part 520 to fix the moving part 520 to three (N) positions by attraction with the magnet 521a and may be fixed to one side surface of the lens module 200.

Figure 10:
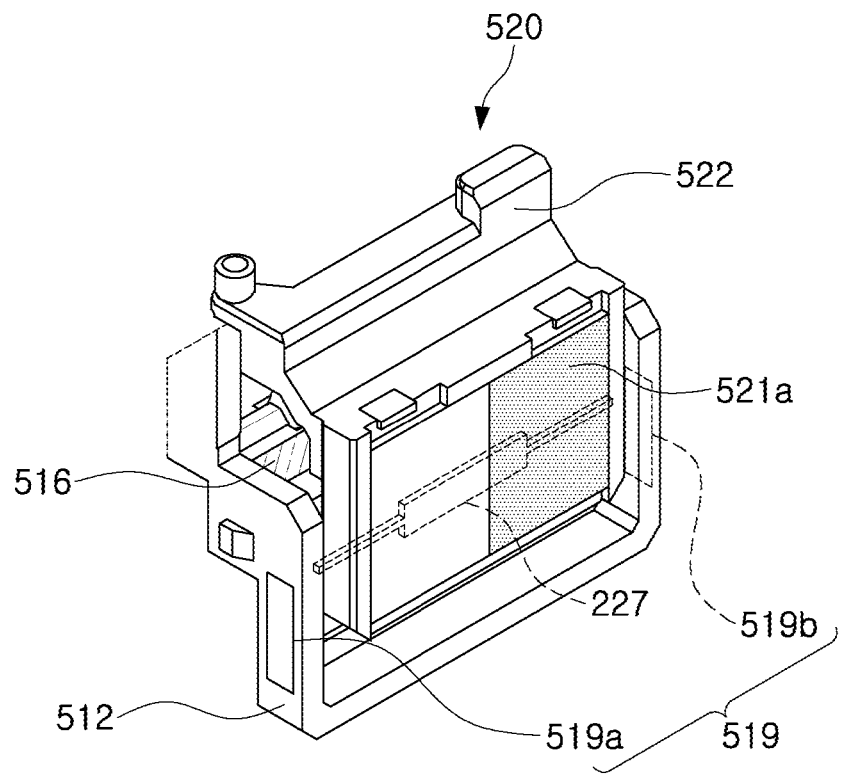

Further, as illustrated in FIG. 10, a yoke 519 according to the present example may have one (N−2) yoke 227 fixed to one side surface of the lens module 200 and two holding yokes 519a and 519b fixed to the base 510 (movement guide part 512) to face both side surfaces of the magnet 521a to fix the moving part 520 to three (N) positions by attraction with the magnet 521a of the aperture module 500.

Figure 11:
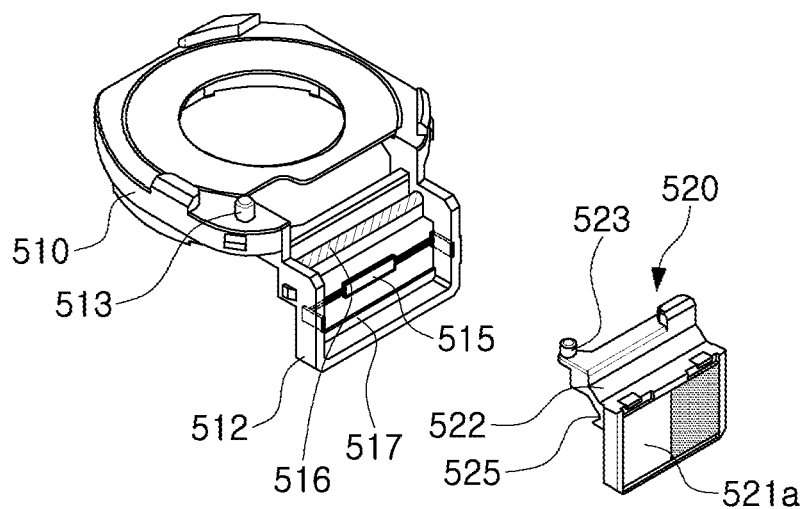
FIG. 11 is an exploded perspective view of an aperture module according to one or more other embodiments in the present disclosure.

Meanwhile, as illustrated in FIG. 11, an aperture module 501 according to another example in the present disclosure, may include a yoke 515 on the base 510 without a yoke on the lens module 200. More specifically, the yoke 515 may be provided on the movement guide part 512 extending in the optical axis direction on the base 510 so as to face the magnet 521a.

Also, in this case, when the moving part 520 moves along the movement guide part 512 in the direction perpendicular to the optical axis direction, the yoke 225 may maintain the moving part 520 fixed to three (N) positions by attraction with the driving magnet 521a. That is, although power is not applied to the coil 521b, the moving part 520 may be fixed in position by attraction with the yoke 225 (or holding yoke) and maintained in a state of forming any one of large, medium-sized, and small incident holes.

Figure 12:
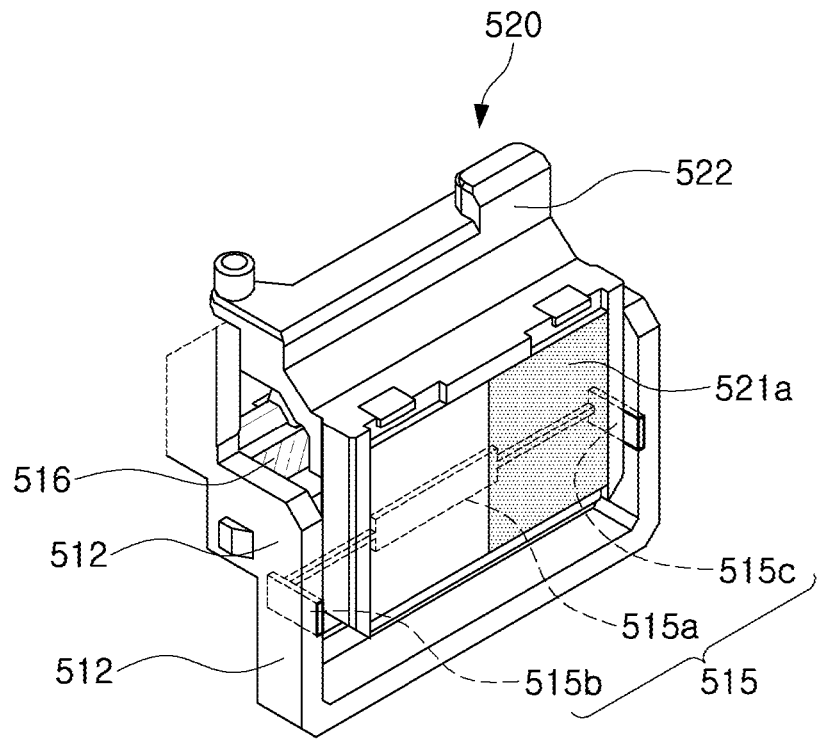
FIGS. 12 and 13 are reference views illustrating a positional relationship between a yoke and a driving magnet according to one or more still other embodiments in the present disclosure.

As illustrated in FIG. 12, a yoke 515 according to one or more other embodiments, may include one (N−2) extended portion 515a having a width larger than those of other portions in the optical axis direction to face a front surface of the magnet 521a and two first holding portions 515b and 515c extending from the extended portion 515a to both sides and fixed to the base 510 (movement guide part 512) of the aperture module 500 to face both side surfaces of the magnet 521a so as to fix the moving part 520 to three (N) positions by attraction with the magnet 521a. Also, the two first holding portions 515b and 515c may be fixed to the movement guide part 512.

Figure 13:
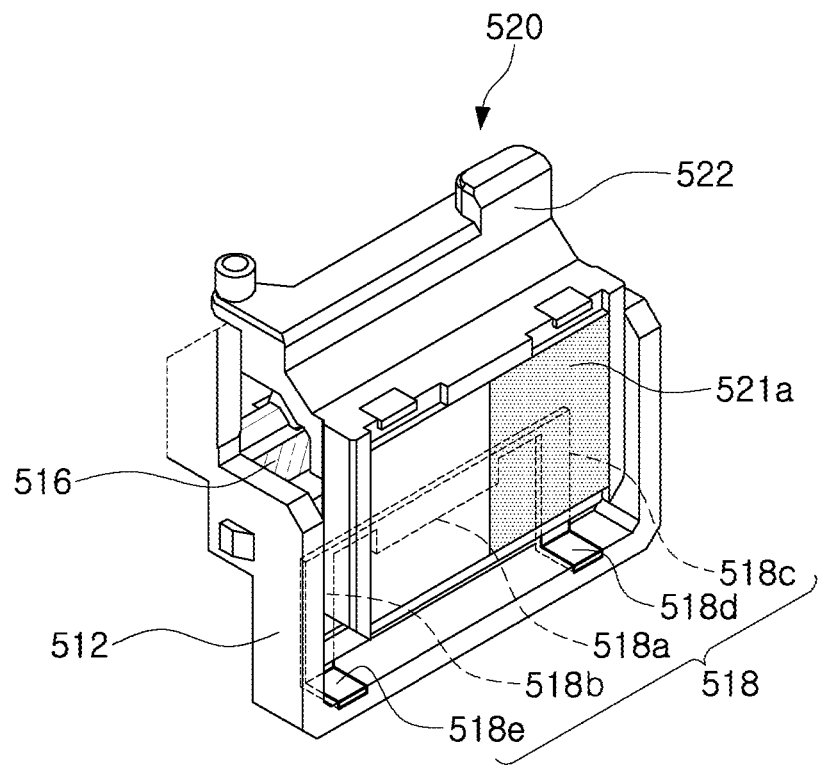

Alternatively, as illustrated in FIG. 13, a yoke 518 according to one or more still other embodiments, may include one (N−2) extended portion 518a having a width larger than those of other portions in the optical axis direction to face the front surface of the magnet 521a and two second holding portions 518b and 518c extending to both sides from the extended portion 518a and extending in the optical axis direction so as to fix the moving part 520 to three (N) positions by attraction with the magnet 521a. Also, the two second holding portions 518b and 518c may be fixed to the movement guide part 512.

Further, the yoke 518 according to one or more still other embodiments, may further include two third holding portions 518d and 518e extending from the two second holding portions 518b and 518c to face both side surfaces of the magnet 521a. The two second holding portions 518b and 518c and/or the third holding portions 518d and 518e may be fixed to the movement guide part 512.

Figure 14:
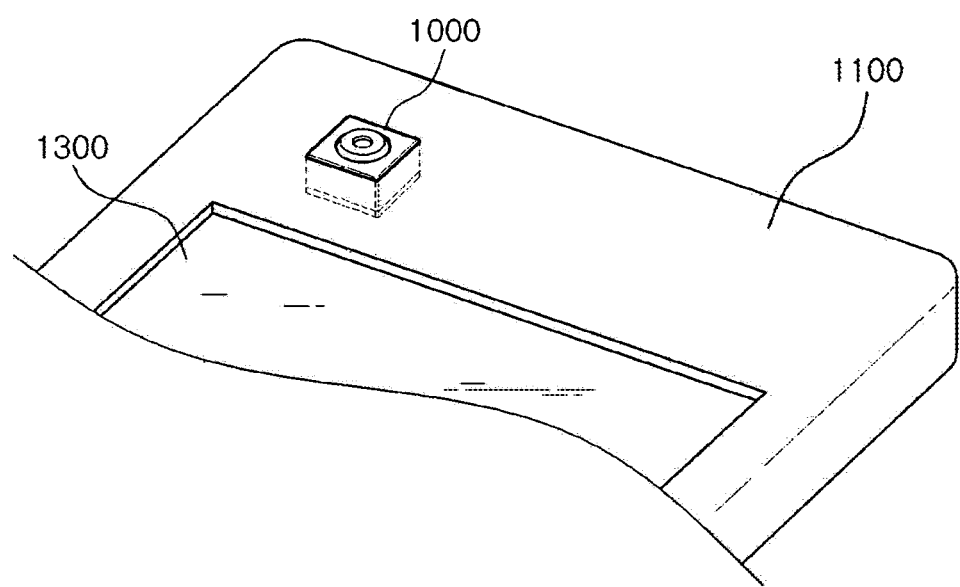
FIG. 14 is a perspective view illustrating one or more examples of a portable electronic apparatus with an example camera module.

Referring to FIG. 14, the camera module 1000, according to the examples described herein, may be a mobile device, such as a portable electronic apparatus 1100, and further include a display unit 1300, wherein the camera module 1000 is installed as a front camera of the portable electronic apparatus 1100 along with the display unit 1300 or as a back camera on a side of the portable electronic apparatus 1100 other than a side with the display unit 1300. As described in the various examples, an electrical signal converted by an image sensor of the camera module 1000 may be output as an image via the display unit 1300 of the portable electronic apparatus 1100.

Figure 15:
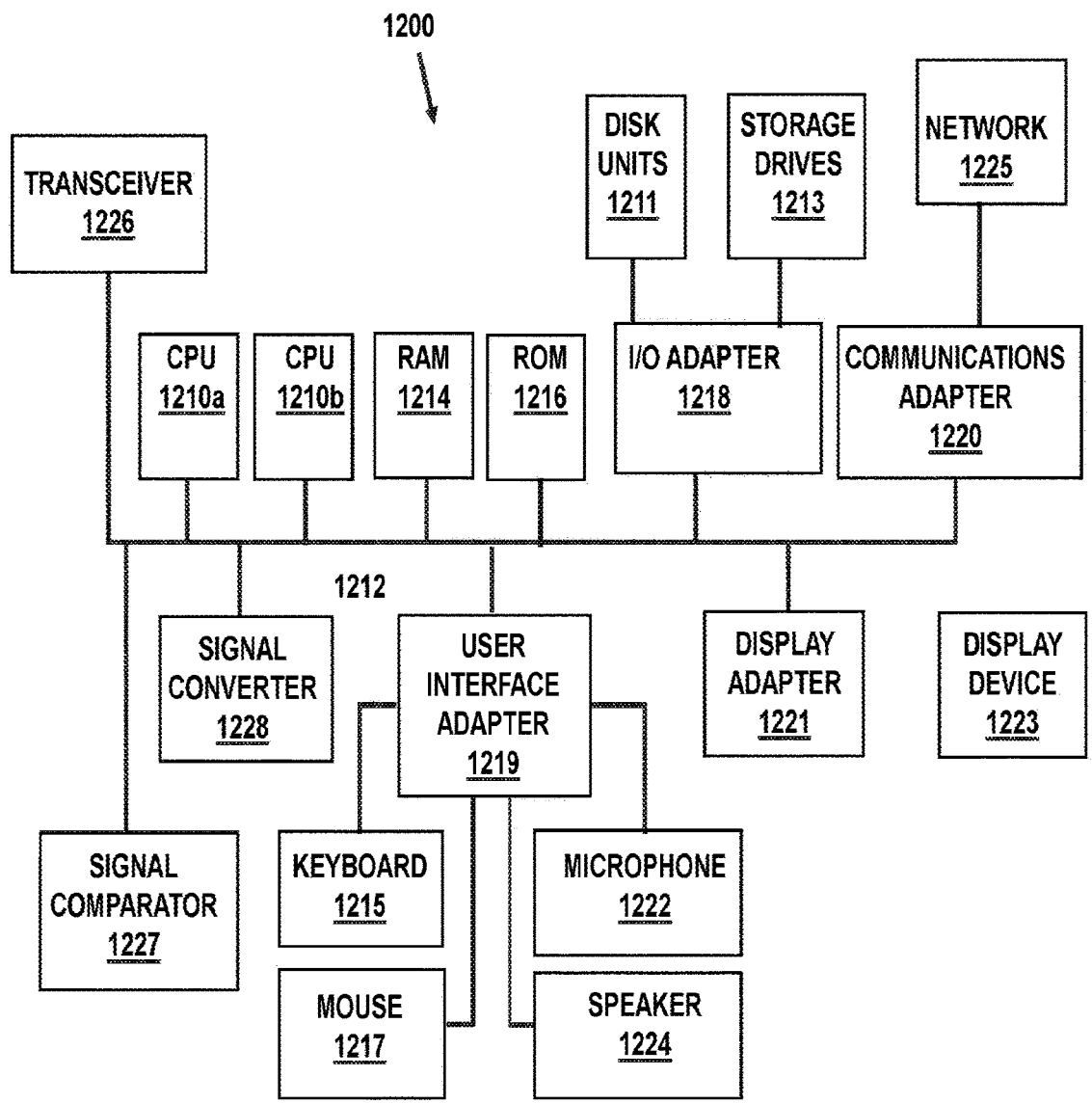
FIG. 15 is a schematic diagram of an example controller used in accordance with the embodiments herein.

A representative example hardware environment for practicing one or more embodiments described herein is depicted in FIG. 15, with reference to FIGS. 1 through 14. For example, the controller 910 can be represented by the information handling/computer system 1200 illustrated schematically in FIG. 15. This schematic drawing illustrates a hardware configuration of an information handling/computer system 1200 in accordance with one or more embodiments in the present disclosure. The system 1200 may include at least one processor or central controller (CPU) 1210*a*, 1210*b*. The CPUs 1210*a*, 1210*b* may be interconnected via system bus 1212 to various devices such as a random access memory (RAM) 1214, read-only memory (ROM) 1216, and an input/output (I/O) adapter 1218. The I/O adapter 1218 may connect to peripheral devices, such as disk units 1211 and storage drives 1213, or other program storage devices that are readable by the system. The system 1200 may read the example instructions on the program storage devices and follow these instructions to execute the methodology of the embodiments herein. The system 1200 may further include a user interface adapter 1219 that connects a keyboard 1215, mouse 1217, speaker 1224, microphone 1222, and/or other user interface devices such as a touch screen device (not shown) to the bus 1212 to gather user input. Additionally, a communication adapter 1220 may connect the bus 1212 to a data processing network 1225, and a display adapter 1221 may connect the bus 1212 to a display device 1223, which provides a GUI in accordance with the embodiments herein, or which may be embodied as an output device such as a monitor, printer, or transmitter, for example. Further, a transceiver 1226, a signal comparator 1227, and a signal converter 1228 may be connected with the bus 1212 for processing, transmission, receipt, comparison, and conversion of electric or electronic signals. For example, the system 1200 may perform autofocus, shake correction, and accurately realizing various aperture diameters by fixing a driving part of the aperture module 1000 in an accurate position according to the examples described herein.

According to the camera module of the examples disclosed herein, the incident amount of light may be selectively changed through the aperture module, performance of the autofocus adjustment function is not deteriorated although the aperture module is mounted, and an increase in weight due to adoption of the aperture module may be minimized.

As set forth above, the camera module of the examples disclosed herein minimizes the increase in weight of the driving part although the aperture module is mounted, and may maintain the performance of the autofocus and camera shake correction function.

Also, the aperture module according to the examples disclosed herein may accurately realize various diameters.

While specific embodiments have been shown and described above, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
a housing comprising a lens module;
an aperture module disposed above the lens module and comprising a plurality of blades configured to form incident holes having different sizes in multiple stages or successively;
a moving part configured to linearly reciprocate to move at least a portion of the blades, comprising a driving magnet facing a driving coil;
a position sensor configured to sense a position of the moving part according to an interaction with the driving magnet; and
a controller configured to receive a signal from the position sensor and confirm or correct the position of the moving part.

2. The camera module of claim 1, wherein the position sensor is disposed inside the driving coil, or outside the driving coil adjacent to a side surface of the driving coil.

3. The camera module of claim 1, wherein the position sensor is a Hall sensor.

4. The camera module of claim 1, wherein the plurality of blades are three or more blades.

5. The camera module of claim 1, wherein the plurality of blades are further configured to form N incident holes having different sizes in multiple stages, where N is a natural number.

6. The camera module of claim 5, wherein N is a natural number equal to or greater than 3.

7. The camera module of claim 6, wherein the moving part is further configured to stop at any of N positions along a movement path of the moving part, where N is a natural number, and a number of the N positions is equal to a number of the N incident holes.

8. The camera module of claim 7, wherein the aperture module further comprises a base,
the moving part is further configured to linearly reciprocate along a side surface of the base, and
the camera module further comprises at least one yoke disposed on the lens module or the base and facing the driving magnet.

9. The camera module of claim 8, wherein the at least one yoke is N yokes, where N is a natural number, and a number of the N yokes is equal to a number of the N positions, and
the N yokes are disposed at intervals along a line parallel to the movement path of the moving part facing respective ones of the N positions.

10. The camera module of claim 8, wherein the at least one yoke is a single yoke extending along a line parallel to the movement path of the moving part.

11. The camera module of claim 10, wherein the single yoke comprises N extended portions and other portions disposed between the N extended portions, where N is a natural number, and a number of the N extended portions is equal to a number of the N positions, the N extended portions are disposed at intervals along a line parallel to the movement path of the moving part facing respective ones of the N positions, and a height of each of the extended portions in an optical axis direction is greater than a height of each of the other portions in the optical axis direction.

12. The camera module of claim 1, wherein the plurality of blades are three blades, and at least one of the three blades is further configured not to move while the moving part moves along a first section of a movement path of the moving part, and to move as the moving part moves along a second section of the movement path of the moving part.

13. The camera module of claim 1, wherein the plurality of blades are four blades, and at least one of the four blades is further configured not to move while the moving part moves along a first section of a movement path of the moving part, and to move as the moving part moves along a second section of the movement path of the moving part.

14. A portable electronic apparatus comprising:

the camera module of claim 1 further configured to convert light incident through the lens module to an electrical signal; and a display unit disposed on a surface of the portable electronic apparatus and configured to display an image based on the electrical signal.

15. The camera module of claim 1, wherein the driving magnet faces the driving coil in a direction intersecting an optical axis direction, and the position sensor is disposed inside the driving coil, or outside the driving coil adjacent to a side surface of the driving coil.

16. A camera module comprising:

a housing comprising a lens module configured to move in an optical axis direction relative to the housing;

an aperture module disposed above the lens module and configured to move in the optical axis direction relative to the housing along with the lens module;

a moving part configured to linearly reciprocate to move at least a portion of the blades, comprising a driving magnet facing a driving coil; and a position sensor configured to sense a position of the moving part according to an interaction with the driving magnet, wherein the driving coil and the position sensor are disposed on the housing.

17. The camera module of claim 16, further comprising a yoke facing the driving magnet and disposed on the lens module.

18. The camera module of claim 16, wherein the aperture module further comprises:

a base; and a yoke facing the driving magnet and disposed on the base, wherein the moving part is further configured to linearly reciprocate along a side surface of the base.

19. An aperture module comprising:

a plurality of blades overlapping each other in an optical axis direction and comprising through holes configured to form an aperture, the blades being disposed rotatably on a base;

a holding yoke;

a moving part coupled to the blades, configured to slide linearly relative to the base to rotate at least one of the blades to change a size of the aperture formed by the through holes, and comprising a magnet, wherein an attraction between the holding yoke and the magnet stably holds the moving part at any of two or more positions spaced apart along a movement path of the moving part and respectively corresponding to two or more predetermined sizes of the aperture.

20. The aperture module of claim 19, wherein the holding yoke is disposed on the base.

21. The aperture module of claim 19, further comprising:

a driving coil facing the magnet and configured to drive the magnet to move the moving part to the two or more positions;

a sensor configured to sense a position of the moving part according to an interaction with the magnet; and a controller configured to control the moving part to stay at one of the two or more positions or slide linearly relative to the base to another one of the two or more positions in response to a signal from the sensor.

* * * * *